United States Patent
Ma et al.

(10) Patent No.: US 9,774,496 B2
(45) Date of Patent: Sep. 26, 2017

(54) CONFIGURATION INFORMATION AUTO-MANAGEMENT METHOD BASED ON INTELLIGENT SUBSTATION

(75) Inventors: Huayi Ma, Beijing (CN); Baihua Xue, Beijing (CN); Jianchao Huang, Beijing (CN); Yingjun He, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 513 days.

(21) Appl. No.: 14/365,962

(22) PCT Filed: Jul. 4, 2012

(86) PCT No.: PCT/CN2012/078162
§ 371 (c)(1),
(2), (4) Date: Jul. 16, 2015

(87) PCT Pub. No.: WO2014/000317
PCT Pub. Date: Jan. 3, 2014

(65) Prior Publication Data
US 2015/0341207 A1    Nov. 26, 2015

(30) Foreign Application Priority Data
Jun. 29, 2012 (CN) .......................... 2012 1 0226647

(51) Int. Cl.
*G06F 15/177* (2006.01)
*H04L 12/24* (2006.01)
(Continued)

(52) U.S. Cl.
CPC ........ *H04L 41/0803* (2013.01); *H04L 12/413* (2013.01); *H04L 41/08* (2013.01);
(Continued)

(58) Field of Classification Search
CPC ... H04L 41/08; H04L 12/413; H04L 61/6004; Y02B 60/44; Y02B 60/43; Y04S 40/162
See application file for complete search history.

(56) References Cited

U.S. PATENT DOCUMENTS

2008/0127210 A1* 5/2008 Bosold ................. H04L 67/025
719/313
2010/0040068 A1* 2/2010 Wimmer ................. H04L 41/08
370/395.53
(Continued)

FOREIGN PATENT DOCUMENTS

CN   101789624 A   7/2010
CN   101706816 B   5/2011
(Continued)

*Primary Examiner* — Padma Mundur
(74) *Attorney, Agent, or Firm* — TIPS Group

(57) ABSTRACT

The invention discloses a method of automatic management on configuration information based upon an intelligent substation, the intelligent substation applying the IEC-61850 standard including IED devices and a switch, wherein the method includes the following steps: parsing an intelligent substation configuration file to acquire communication configuration information and communication association configuration information of the IED devices; and generating a switch configuration file from the communication configuration information and the communication association configuration information of the IED devices. The invention can parse the intelligent substation configuration file, generate the switch configuration file and perform automatic configuration of the industrial Ethernet switch in the intelligent substation using the switch configuration file.

6 Claims, 2 Drawing Sheets

(51) Int. Cl.
*H04L 12/413* (2006.01)
*H04L 29/12* (2006.01)

(52) U.S. Cl.
CPC ...... *H04L 61/2038* (2013.01); *H04L 61/6004* (2013.01); *Y02B 60/43* (2013.01); *Y02B 60/44* (2013.01); *Y04S 40/162* (2013.01)

(56) References Cited

U.S. PATENT DOCUMENTS

2013/0117421 A1* 5/2013 Wimmer ............... G06F 15/177
709/220
2013/0215771 A1* 8/2013 Obrist ................. H04L 41/0213
370/252

FOREIGN PATENT DOCUMENTS

| CN | 102075378 A | 5/2011 |
| CN | 101610171 B | 9/2011 |

\* cited by examiner

CONFIGURATION INFORMATION AUTO-MANAGEMENT METHOD BASED ON INTELLIGENT SUBSTATION

The present application is a US National Stage of International Application No. PCT/CN2012/078162, filed Jul. 4, 2012, designating the United States, and claiming priority to Chinese Patent Application No. 201210226647.7, filed with the Chinese Patent Office on Jun. 29, 2012 and entitled "Configuration Information Auto-Management Method Based on Intelligent Substation", both of which are incorporated by reference.

FIELD OF THE INVENTION

The present invention relates to the field of intelligent substations and particularly to a method of automatic management on configuration information based upon an intelligent substation.

BACKGROUND OF THE INVENTION

A substation is evolving toward an intelligent substation and communication between intelligent electronic devices in the intelligent substation and related system requirements are defined in the IEC-61850 standard; and communication, configuration, management, supervision and the like of the devices in the intelligent substation has to comply with the IEC-61850 standard.

A configuration management method based upon the IEC-61850 standard is adopted for all the devices in the intelligent substation (other than an industrial Ethernet switch); and each Intelligent Electronic Device (IED) provides an IED Configuration Description (ICD) file, and a system configuration tool of the intelligent substation formulates system configuration of the entire substation from the ICD files, and the system configuration tool exports a configuration file of Configured IED Description (CID) of each IED device, where the configuration file needs to be downloaded to the IED device, thereby configuring the entire substation.

The industrial Ethernet switch provides a communication medium for the respective IED devices of the substation as well as a data management function, but is not required to provide the foregoing management method based upon the IEC-61850 standard; and an existing switch configuration scheme generally refers to a web page, command line (telnet or SSH-enabled) or SNMP scheme, and as compared with the other IED devices of the intelligent substation, this scheme suffers from complicated configuration and is troublesome and susceptible to a configuration error, particularly for a user without any experience in using the switch.

In the prior art, an implementation is to improve the configuration of the industrial Ethernet switch for the data management function using the GMRP protocol according to a subscriber and distributor model of the intelligent substation system but also has some apparent drawbacks: firstly each set of data is provided with a different MAC address so that there are a large number of multicast groups to be registered, for example, more than 200 for a substation at a normal size, and for such a large number of multicast groups, there is some risk in data management and also a high requirement on the switch; secondly the GMRP protocol is built over a VLAN which also needs to be configured, and an automatic configuration function can not be fully performed although the configuration of the VLAN may be alleviated with the (GARP Multicast Registration Protocol) GMRP; and thirdly the respective IED devices and the switches in all the networks are required to support the GMRP protocol, which may be difficult to realize.

SUMMARY OF THE INVENTION

In view of this, the invention provides a method of automatic management on configuration information based upon an intelligent substation.

The invention provides a method of automatic management on configuration information based upon an intelligent substation, the intelligent substation applying the IEC-61850 standard including IED devices and a switch, wherein the method includes the following steps:

parsing an intelligent substation configuration file to acquire communication configuration information and communication association configuration information of the IED devices; and generating a switch configuration file from the communication configuration information and the communication association configuration information of the IED devices.

Preferably the method includes the steps of:

loading the switch configuration file into the switch;

the switch identifying, according to the switch configuration file, an IED device connected to a port of the switch; and the switch registering dynamically a VLAN with the switch according to the identified connected IED device and the switch configuration file.

Preferably the intelligent substation configuration file includes SCD files including a description of IED device capabilities, an IED communication section description, an association relationship model between the IED devices, and an IED configuration description and attribute template.

Preferably the communication configuration information of the IED devices includes IED names, control block names, MAC addresses and a VLAN ID; and/or the communication association configuration information of the IED devices includes a local IED name, a remote IED name and a control block name.

Preferably the switch configuration file includes an IED communication model configuration file and an IED communication association configuration file; the IED communication model configuration file includes IED names, control block names, MAC addresses and a VLAN ID; and the IED communication association configuration file includes a local IED name, a remote IED name and a control block name.

Preferably the switch configuration file is generated from the communication configuration information of the IED devices by:

parsing by a DOM facility the communication configuration information of the IED de ice into an SCD DOM file;

searching the SCD DOM file for node information and storing the node information into an IED communication model link table; and traversing the IED communication model link table and outputting a communication model configuration file in a switch format the communication model configuration file includes the IED names, the control block names, the MAC addresses and the VLAN ID.

Preferably the switch configuration file is generated from the communication association configuration information of the IED devices by:

parsing by a DOM facility the communication association configuration information of the IED device into an SCD DOM file;

searching the SCD DOM file for a virtual terminal connection and storing the virtual terminal connection into an IED communication association link table;

traversing the IED communication association link table and searching for a data set of virtual terminal connections;

searching the data set of virtual terminal connections for an IED communication association control block; and outputting the IED communication association configuration file in a switch format.

Preferably the switch identifies according to the configuration information file an IED device connected to a switch port by:

all the ports of the switch starting the LLDP protocol in a default status, and if a port receives an LLDP protocol message in which a local device is the switch device, then determining the port as a cascade port of the switch; otherwise, determining the port as a non-cascade port;

the switch enabling an ACL function at the non-cascade port and obtaining a GOOSE/GSE-type message under a matching rule; and the switch matching an MAC address in the IED communication model configuration file against a destination MAC address in the GOOSE/GSE-type message to identify an IED device connected to the switch port.

Preferably the switch registering dynamically the VLAN with the switch according to the identified connected IED device and the switch configuration file by:

inquiring the communication association configuration information in the switch configuration file as per the local IED device identified by the switch to obtain a remote IED name and a control block name, and inquiring the communication configuration information of the IED device in the switch configuration file as per the remote IED name and the control block name to obtain VLAN ID information to be configured to the switch; and as per the VLAN ID information to be configured to the switch, firstly configuring the switch port, to which the local IED is connected, with the VLAN ID, and registering the VLAN ID, with other non-cascade ports than the switch port to which the local IED is connected, through the GVRP protocol.

The invention can parse the intelligent substation configuration file, generate the switch configuration file and perform automatic configuration of the industrial Ethernet switch in the intelligent substation using the switch configuration file. Due to the use of the information in the existing intelligent substation configuration file, there is a very implementation. Moreover with the inventive management method, management operations on the configuration information can become simple and convenient and facilitate subsequent maintenance and troubleshooting.

BRIEF DESCRIPTION OF THE DRAWINGS

The drawings described here serve to provide further understanding of the invention and constitute a part of the invention, and exemplary embodiments of the invention and their description serve to explain but not to limit unduly the invention. In the drawings.

DETAILED DESCRIPTION OF THE EMBODIMENTS

Preferred embodiments of the invention will be described below with reference to the drawings, and it shall be appreciated that the preferred embodiments described here are merely intended to explain and set forth but not to limit the invention.

As per the IEC-61850 standard, each IED device needs to provide a device capability model. i.e., an ICD file. A system configuration tool of an intelligent substation formulates system configuration of the entire substation from the ICD files of the respective IED devices into an SCD configuration file (a system configuration file of the intelligent substation), and the system configuration tool exports a configuration file CID (an IED device configuration file) of each IED device, where the configuration file needs to be imported into the IED device, thereby configuring the entire substation.

All the ICD, SCD and CID files comply with the XML file format; and related file formats of Intelligent Electronic Device (IED) configuration and IED parameters, communication system configuration, a switch field (function) structure and their mutual relationships are defined in the IEC-61850 standard. These files (ICD, SCD and CID) are described so that data in the files can be exchanged compatibly between intelligent electronic dec ice engineering facilities and system engineering facilities of different manufacturers.

Figure 1:
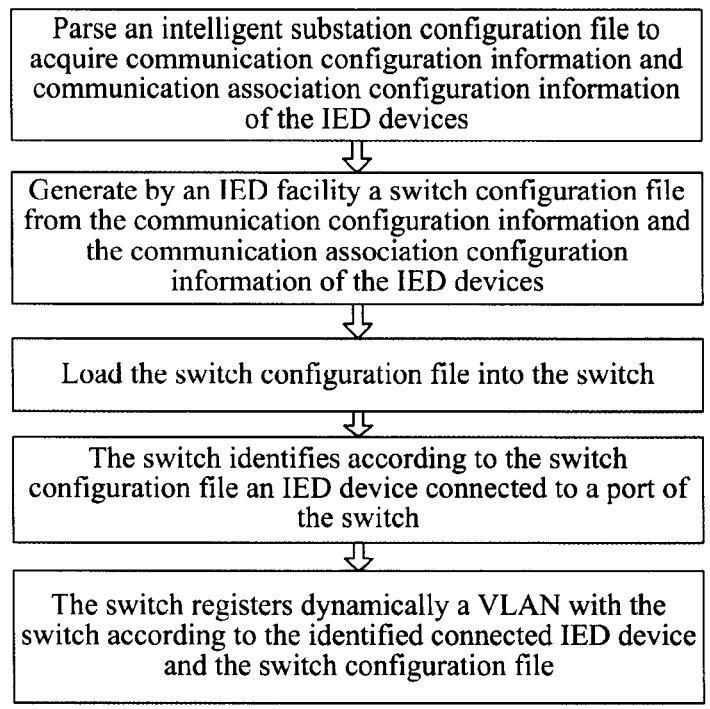
FIG. 1 is a flow chart of a method of automatic management on configuration information based upon an intelligent substation.

The invention provides a method of automatic management based upon an intelligent substation, and as illustrated in FIG. 1, the intelligent substation applying the IEC-61850 standard includes IED devices and a switch, the method including the following steps:

(1) An intelligent substation configuration file is parsed to acquire communication configuration information and communication association configuration information of the IED devices:

(2) A switch configuration file is generated by an IED facility from the communication configuration information and the communication association configuration information of the IED devices;

(3) The switch configuration file is loaded into the switch;

(4) The switch identifies according to the switch configuration file an IED device connected to a port of the switch; and (5) The switch registers dynamically a VLAN with the switch according to the identified connected IED device and the switch configuration file, that is, through GARP VLAN Registration Protocol (GVRP).

The intelligent substation configuration file includes SCD files including a description of IED device capabilities, an IED communication section description, an association relationship model between the IED devices, and an IED configuration description and attribute template.

The communication configuration information of the IED devices includes IED names, control block names, MAC addresses and a VLAN ID.

The communication association configuration information of the IED devices includes a local IED name, a remote IED name and a control block name.

Figure 2:
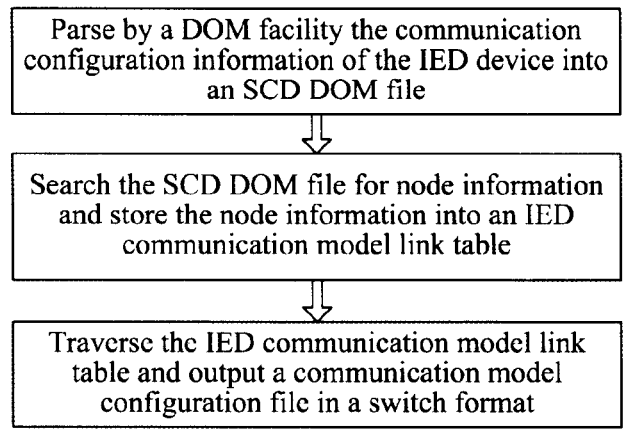
FIG. 2 is a flow chart of parsing communication configuration information of an IED device from IED device configuration information.

As illustrated in FIG. 2, the IED device configuration information is parsed to acquire the communication configuration information of the IED device in the following steps:

(1) The communication configuration information of the IED device is parsed by a Document Object Model (DOM) facility into an SCD DOM file;

(2) The SCD DOM file is searched for node information, which is in turn stored into an IED communication model link table; and (3) The IED communication model link table is traversed, and a communication model configuration file in a switch format is output.

The communication model configuration file includes the IED names, the control block names, the MAC addresses and the VLAN ID.

In the foregoing process, processing by DOM facility software has several advantages. Firstly a tree is permanent in a memory, so it can be modified so that data and a structure can be altered by an application; secondly the tree can be navigated up and down anytime instead of one-time processing as with SAX; and thirdly it is also much easier to use a DOM. With the DOM facility software, an SCD text file in the XML language can be parsed into an SCL DOM object to thereby provide a basic for a subsequent search. In order for a subsequent rapid search, useless sub-nodes in an SCL DOM object are deleted, including History, dataTypeTemplates, LN and DOI, for example;

In the search, a ConnectedAP sub-node is searched for under a Communication sub-node of a communication node section in an SCD file, and if there are SMV and GSE sub-nodes under the ConnectedAP sub-node, then an Address sub-node is searched for GOOSE and SMV, which are in turn stored in the IED communication model link table. The IED communication model link table is structured as follows:

TABLE 1

| ID | Name | Description |
|---|---|---|
| 1 | iedName | IED name |
| 2 | cbName | Name of control block in LLNO of logic device Idinst |
| 3 | macAddr | MAC address |
| 4 | VLAN | VLAN ID |

The communication model configuration file in the switch format is as follows:

ied xianlibiankaiguan cbname gocb1 vlan 100 mac 01-0c-cd-01-00-01 ied xianlibiankaiguan cbname gocb2 vlan 200 mac 01-0c-cd-01-00-02 ied xianlibiankaiguan cbname gocb3 vlan 300 mac 01-0c-cd-01-00-03 ied xianlibiankaiguan cbname gocb4 vlan 400 mac 01-0c-cd-01-00-04 ied zhongkaiguan cbname gocb1 vlan 500 mac 01-0c-cd-01-00-05 ied zhongkaiguan cbname gocb2 vlan 600 mac 01-0c-cd-01-00-06 ied zhongkaiguan cbname gocb3 vlan 700 mac 01-0c-cd-01-00-07 ied zhongkaiguan cbname gocb4 vlan 800 mac 01-0c-cd-01-00-08 ied xianlubaohu cbname GO_Gcb3 vlan 900 mac 01-0c-cd-01-00-09 ied xianlibiankaiguan cbname smvcb vlan 10 mac 01-0c-cd-04-00-01 ied zhongkaiguan cbname smvcb vlan 20 mac 01-0c-cd-04-00-02

Figure 3:
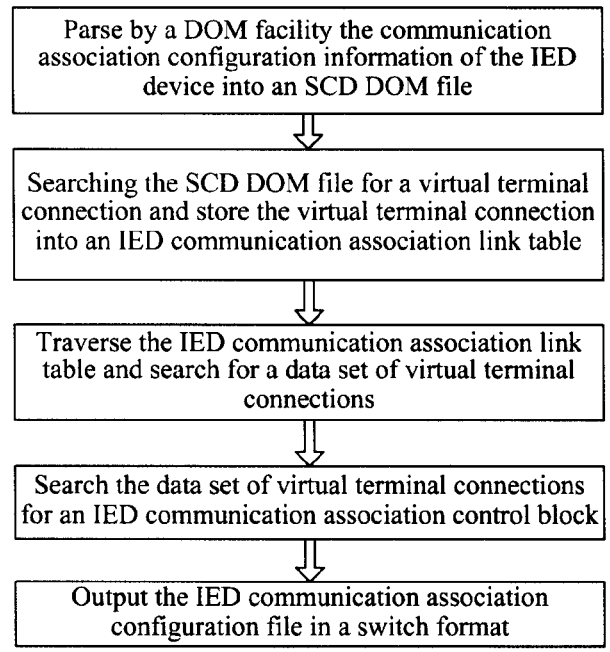
FIG. 3 is a flow chart of parsing communication association configuration information of an IED device from an IED device configuration file.

As illustrated in FIG. 3, the IED device configuration file is parsed to acquire the communication association configuration information of the IED device in the following steps:

(1) The communication association configuration information of the IED device is parsed by the DOM facility into an SCD DOM file;

(2) The SCD DOM file is searched for a virtual terminal connection, which is in turn stored into an IED communication association link table;

(3) The IED communication association link table is traversed and searched for a data set of virtual terminal connections;

(4) The data set of virtual terminal connections is searched for an IED communication association control block; and (5) The IED communication association configuration file is output.

The IED communication association configuration file includes a local IED name, a remote IED name and a control block name.

The virtual terminal connection is a description of communication association between IED devices, that is, a correspondence relationship between external data objects to be associated by an IED data object in question. The virtual terminal connection is marked by a field 'ExtRef'. In the search, the IED file (the data set) can be searched for an IED communication association control block by a parameter of the virtual terminal connection (e.g., an IED name).

The virtual terminal connection is described in the following format:

<ExtRef daName="stVal" doName="Op2" iedName="xianlubaohu" intAddr="PI/GOINGGIO1.SPCSO5.stVal" ldInst="PI01" lnClass="GGIO" lnInst="1"/>

The IED communication association link table is as depicted in Table 2 where meanings of respective parameters in the virtual terminal connection are described.

TABLE 2

| Internal virtual terminal | intAddr | Internal virtual terminal |
|---|---|---|
| External virtual terminal | daName | Data attribute name |
| | doName | Data object name |
| | iedName | ied name |
| | ldINst | Logic device instance |
| | lnClass | Logic node instance |

In order for a rapid search, useless sub-nodes in an SCL DOM object are deleted, including History, dataTypeTemplates, LN and DOI, for example.

In traversing the IED communication association link table, the dataset where is the virtual terminal is located is searched by iedName, ldInst, lnClass, doName and daName in the virtual terminal connection; and the dataset where is the virtual terminal is located is searched for the IED communication association control block.

The IED communication association configuration file in the switch format is as follows:

localied xianlibiankaiguan vircon remote_ied xianlubaohu cbname GO_Gcb3
localied xianlibiankaiguan vircon remote_ied xianlubaohu cbname GO_Gcb3
localied xianlubaohu vircon remote_ied xianlibiankaiguan cbname smvcb
localied xianlubaohu vircon remote_ied xianlibiankaiguan cbname smvcb
localied xianlubaohu vircon remote_ied xianlibiankaiguan cbname smvcb
localied xianlubaohu vircon remote_ied zhongkaiguan cbname smvcb
localied xianlubaohu vircon remote_ied zhongkaiguan cbname smvcb
localied xianlubaohu vircon remote_ied xianlibiankaiguan cbname gocb1
localied xianlubaohu vircon remote_ied xianlibiankaiguan cbname gocb1
localied xianlubaohu vircon remote_ied xianlibiankaiguan cbname gocb1
localied xianlubaohu vircon remote_ied zhongkaiguan cbname gocb1
localied xianlubaohu vircon remote_ied zhongkaiguan cbname gocb1
localied xianlubaohu vircon remote_ied zhongkaiguan cbname gocb1

As can be apparent, the IED communication association configuration file in the switch format includes a local IED name, a remote IED name, a control block name and a virtual connection attribute between the local IED and the remote IED. It shall be noted the IED communication association configuration file in the switch format may not include the virtual connection attribute between the local IED and the remote IED.

Moreover, since some device (e.g., a failure recording, testing and controlling apparatus) does not send any IEC-61850 message, the switch can not identify the device. The failure recording, testing and controlling apparatus needs to be configured by the IED facility directly on the configuration facility according to a user need.

In a direct configuration process, a switch IP address and IED associated devices need to re designated in a configuration interface. This is configured into a command line configuration file of the switch as follows:

Local ip [ip-addr]port [1-28] vircon remote ied [ied-name]

An example of the invention is depicted as follows:
Local ip port 1 vircon remote ied zhongkaiguan In order to specify a configuration file version, a configuration file version ID configured by the switch is added to the head of the configuration file; and the configuration file is designated by the user to distinguish between different configuration files.

The configuration file is loaded in numerous ways, for example, it can be loaded to respective switches by ftp software or in batches by facility software. A particular operation process using the facility software is as follows:

The facility software starts a service and broadcasts a configuration load instruction message to all the networked switches, where the configuration load instruction message is sent once every two seconds while the facility software is being started; and a current configuration file version number is used as a load sequence number of the configuration load instruction message to prevent the configuration file from being loaded repeatedly to the switch;

The facility software starts a TFTP/FTP server and sets a path, a username and a password; and The switch receives the configuration load instruction and decides from the load version number in the instruction whether to load the configuration file. If the configuration file version number in the instruction is not consistent with that of the switch, then the switch starts a TFTP/FTP client and downloads the configuration file from a facility software server; otherwise, the switch does not load the configuration file designated by the configuration load instruction.

The switch opens the downloaded configuration file and runs the configuration file. Upon successful running, the switch sends to the facility software server a configuration load success message carrying essential information of the switch in question, including an IP address, an MAC address, a device name, etc.

Figure 4:
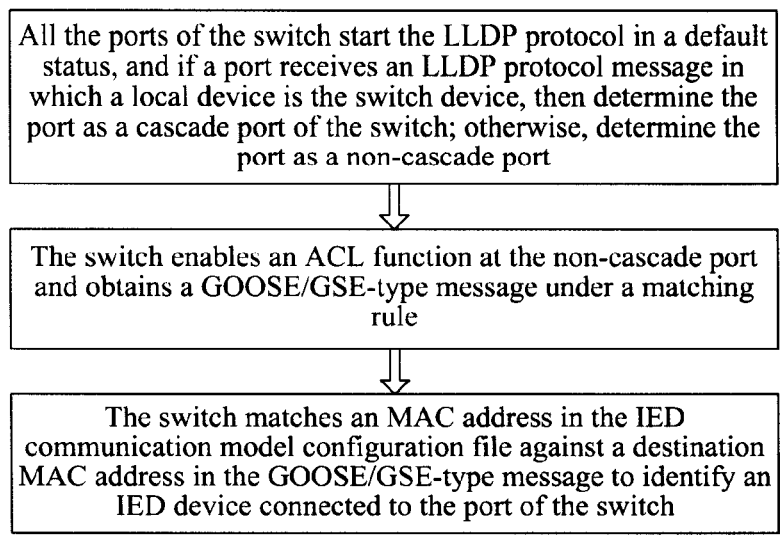
FIG. 4 is a flow chat of a switch identifying according to a configuration information file an IED device connected to a switch port.

As illustrated in FIG. 4, the switch identifies according to the configuration information file an IED device connected to a switch port in the following steps:

(1) All the ports of the switch start the Link Layer Discovery Protocol (LLDP) in a default status, and if a port receives an LLDP protocol message in which a local device is the switch device, then the port is determined as a cascade port of the switch; otherwise, the port is determined as a non-cascade port;

(2) The switch enables an Access Control List (ACL) function at the non-cascade port and obtains a GOOSE/GSE-type message under a matching rule; and (3) The switch matches an MAC address in the IED communication model configuration file against destination MAC address information in the GOOSE/GSE-type message to identify an IED device connected to the switch port.

In the identifying process, a designated type and quantified IED device message (e.g., a GOOSE/GSE message) can be caught to thereby identify an IED device name; and after the name is identified, the configuration file can be traversed to obtain a list of associated VLANs.

The GOOSE/GSE message type is as depicted in Table 3:

TABLE 3

| Application | Value of Ethernet-type code (hexadecimal) | APPID type |
|---|---|---|
| IEC 61850-8-1 GOOSE | 88-B8 | 0 0 |
| IEC 61850-8-1 GSE management | 88-B9 | 0 0 |
| IEC 61850-9-1 sample value | 88-BA | 0 1 |
| IEC 61850-9-2 sample value | 88-BA | 0 1 |

The Ethernet-type field is matched under the ACL rule including 0x88B8 and 0x88B9, and the caught data is sent to a CPU through traffic control. The switch CPU can match an MAC address in the communication model configuration file against the caught GOOSE/GSE message to thereby identify an IED device connected to the switch port.

In the IED communication association configuration file, if no virtual connection attribute between a local IED device and a remote IED device, then the registration process is as follows:

The communication association configuration information in the switch configuration file is inquired as per the local IED device identified by the switch to obtain a remote IED name and a control block name, and the communication configuration information of the IED device in the switch configuration file is inquired as per the remote IED name and the control block name to obtain VLAN ID information to be configured to the switch; and as per the VLAN ID information to be configured to the switch, firstly the switch port to which the local IED is connected is configured with the VLAN ID, and the VLAN ID is registered, with other non-cascade ports than the switch port to which the local IED is connected, through the GVRP protocol.

In the IED communication association configuration file, if there is virtual connection attribute between a local IED device and a remote IED device, then the registration process is as follows: as per at least one identified local IED device name and a remote IED device, the switch CPU determines from the IED communication association configuration file that a connection attribute between the at least one local IED device name and the remote IED device is a virtual connection, and then the CPU registers a VLAN ID with the switch through the GVRP protocol to thereby perform automatic configuration of the switch, thus establishing a VLAN connection between the two IED devices.

The foregoing description illustrates and describes the preferred embodiments of the invention, but as described above, it shall be appreciated that the invention will not be limited to the disclosure of this context and shall not be construed as excluding other embodiments but can be embodied in various other combinations, modifications and environments and can be modified in light of the foregoing teaching or skills or knowledge in the art without departing from the scope of the invention. The modifications and variations made by those skilled in the art without departing from the scope of the invention shall come into the scope of the following claims of the invention.

What is claimed is:

1. A method of automatic management on configuration information based upon an intelligent substation, the intelligent substation applying IEC-61850 standard comprising a plurality of Intelligent Electronic Device (IED) devices and a switch, wherein the method comprises steps of:
   parsing by a Document Object Model (DOM) facility, an intelligent substation configuration file to acquire communication configuration information of the IED devices and outputting a communication model configuration file in a switch format, wherein the communication model configuration file includes IED device names, control block name, media access control (MAC) addresses and virtual Local Area Network identifier ((VLAN ID);
   parsing by the DOM facility, the intelligent substation configuration file to acquire communication association configuration information of the IED devices and outputting an IED communication association configuration file in the switch format, further comprising, identifying virtual terminal connections for an IED control block based on local and remote IED device names in the communication association configuration information;
   generating a switch configuration file from the outputted communication model configuration file and the communication association configuration file;
   loading the switch configuration file into the switch;
   identifying, by the switch, according to the switch configuration file, an IED device connected to a port of the switch; and
   registering, by the switch, dynamically a VLAN with the switch according to the identified IED device and the switch configuration file.

2. The method of automatic management on configuration information based upon an intelligent substation according to claim 1, wherein the intelligent substation configuration file includes an SCD file and the SCD file includes a description of IED device capabilities, an IED communication section description, an association relationship model between the IED devices, and an IED configuration description and attribute template.

3. The method of automatic management on configuration information based upon an intelligent substation according to claim 1, wherein generating the switch configuration file from the communication configuration information of the IED devices further comprises steps of:
   parsing by the DOM facility the communication configuration information of the IED devices into an SCD DOM file;
   searching the SCD DOM file for node information and storing the node information into an IED communication model link table; and
   traversing the IED communication model link table and outputting a communication model configuration file in the switch format,
   wherein the communication model configuration file includes the IED device names, the control block name, the MAC addresses and the VLAN ID.

4. The method of automatic management on configuration information based upon an intelligent substation according to claim 1, wherein generating the switch configuration file from the communication association configuration information of the IED devices further comprises steps of:
   parsing by the DOM facility the communication association configuration information of the IED devices into an SCD DOM file;
   searching the SCD DOM file for a virtual terminal connection and storing the virtual terminal connection into an IED communication association link table;
   traversing the IED communication association link table and searching for a data set of virtual terminal connections;
   searching the data set of virtual terminal connections for the IED communication association control block; and
   outputting the IED communication association configuration file in the switch format.

5. The method of automatic management on configuration information based upon an intelligent substation according to claim 1, wherein identifying by the switch, according to the switch configuration file, the IED device connected to the port of the switch further comprises steps of:
   starting, for all ports of the switch, the LLDP protocol in a default status, and if a port receives an LLDP protocol message in which a local device is the switch device, then determining the port as a cascade port of the switch; otherwise, determining the port as a non-cascade port;
   enabling, by the switch, an ACL function at the non-cascade port and obtaining a GOOSE/GSE-type message under a matching rule; and
   matching, by the switch, MAC address in the IED communication model configuration file against a destination MAC address in the GOOSE/GSE-type message to identify the IED device connected to the port of the switch.

6. The method of automatic management on configuration information based upon an intelligent substation according to claim 1, wherein registering, by the switch, dynamically the VLAN with the switch according to the identified IED device and the switch configuration file further comprises steps of:
   inquiring the communication association configuration information in the switch configuration file according to the local IED device name of the identified IED device by the switch to obtain a remote IED device name and a control block name, and inquiring the communication configuration information of the IED device in the switch configuration file according to the remote IED device name and the control block name to obtain VLAN ID information to be configured to the switch; and configuring the port of the switch, to which the identified IED device is connected, with the VLAN ID, and registering the VLAN ID, with other non-cascade ports than the port of the switch to which the identified IED device is connected, through GVRP protocol.

* * * * *